United States Patent [19]
Overstreet et al.

[11] Patent Number: 5,492,186
[45] Date of Patent: Feb. 20, 1996

[54] STEEL TOOTH BIT WITH A BI-METALLIC GAGE HARDFACING

[75] Inventors: James L. Overstreet, Webster; Ronald L. Jones, Cleveland; Alan J. Massey, Houston, all of Tex.

[73] Assignee: Baker Hughes Incorporated, Houston, Tex.

[21] Appl. No.: 316,665

[22] Filed: Sep. 30, 1994

[51] Int. Cl.$^6$ .................................................. E21B 10/50
[52] U.S. Cl. .............................................................. 175/374
[58] Field of Search ................................... 175/374, 426; 78/108.2, 108.4

[56] References Cited

U.S. PATENT DOCUMENTS

| 2,033,594 | 3/1936 | Stoody | 262/33 |
|---|---|---|---|
| 2,407,642 | 9/1946 | Ashworth | 76/108 |
| 2,660,405 | 11/1953 | Scott et al. | 255/347 |
| 3,158,214 | 11/1964 | Wisler et al. | 175/375 |
| 3,260,579 | 7/1966 | Scales et al. | 29/195 |
| 3,800,891 | 4/1974 | White et al. | 175/374 |
| 3,842,921 | 10/1974 | Dill et al. | 175/374 |
| 3,989,554 | 11/1976 | Wisler | 285/333 |
| 4,262,761 | 4/1981 | Crow | 175/374 |
| 4,455,278 | 6/1984 | van Nederveen et al. | 419/6 |
| 4,499,958 | 2/1985 | Radtke et al. | 175/329 |
| 4,562,892 | 1/1986 | Ecer | 175/371 |
| 4,597,456 | 7/1986 | Ecer | 175/371 |
| 4,630,692 | 12/1986 | Ecer | 175/330 |
| 4,726,432 | 2/1988 | Scott et al. | 175/375 |
| 4,762,028 | 8/1988 | Regan | 76/108 |
| 4,781,770 | 11/1988 | Kar | 148/16.5 |
| 4,836,307 | 6/1989 | Keshavan et al. | 175/374 |
| 4,884,477 | 12/1989 | Smith et al. | 76/108 |
| 4,944,774 | 7/1990 | Keshavan et al. | 51/309 |
| 5,038,640 | 8/1991 | Sullivan et al. | 76/108.2 |
| 5,051,112 | 9/1991 | Keshavan et al. | 51/309 |
| 5,089,182 | 2/1992 | Findeisen et al. | 264/8 |
| 5,152,194 | 10/1992 | Keshavan et al. | 76/108.1 |
| 5,291,807 | 3/1994 | Vanderford et al. | 76/108.2 |
| 5,351,769 | 10/1994 | Scott et al. | 175/374 |
| 5,351,771 | 10/1994 | Zahradnik | 175/374 |

FOREIGN PATENT DOCUMENTS 420747  8/1974  U.S.S.R. .......................... 175/374

*Primary Examiner*—Hoang C. Dang
*Attorney, Agent, or Firm*—Robert A. Felsman; Mark D. Perdue

[57] ABSTRACT

An earth boring bit rotatable cutter having a first hardfacing composition of carbide particles selected from the class of cast and macrocrystalline tungsten carbide dispersed in a steel matrix deposited on the gage surface of at least some of the heel row teeth. A substantial portion of these particles are characterized by a high level of abrasion resistance and a lower level of fracture resistance. A second hardfacing composition of carbide particles selected from the class of spherical sintered and spherical cast tungsten is dispersed in a steel matrix deposited over at least the crest and an upper portion of the gage surface to cover the corner that tends to round during drilling. A substantial portion of the particles of this composition are characterized by a high level of fracture resistance and a lower level of abrasion resistance.

7 Claims, 2 Drawing Sheets

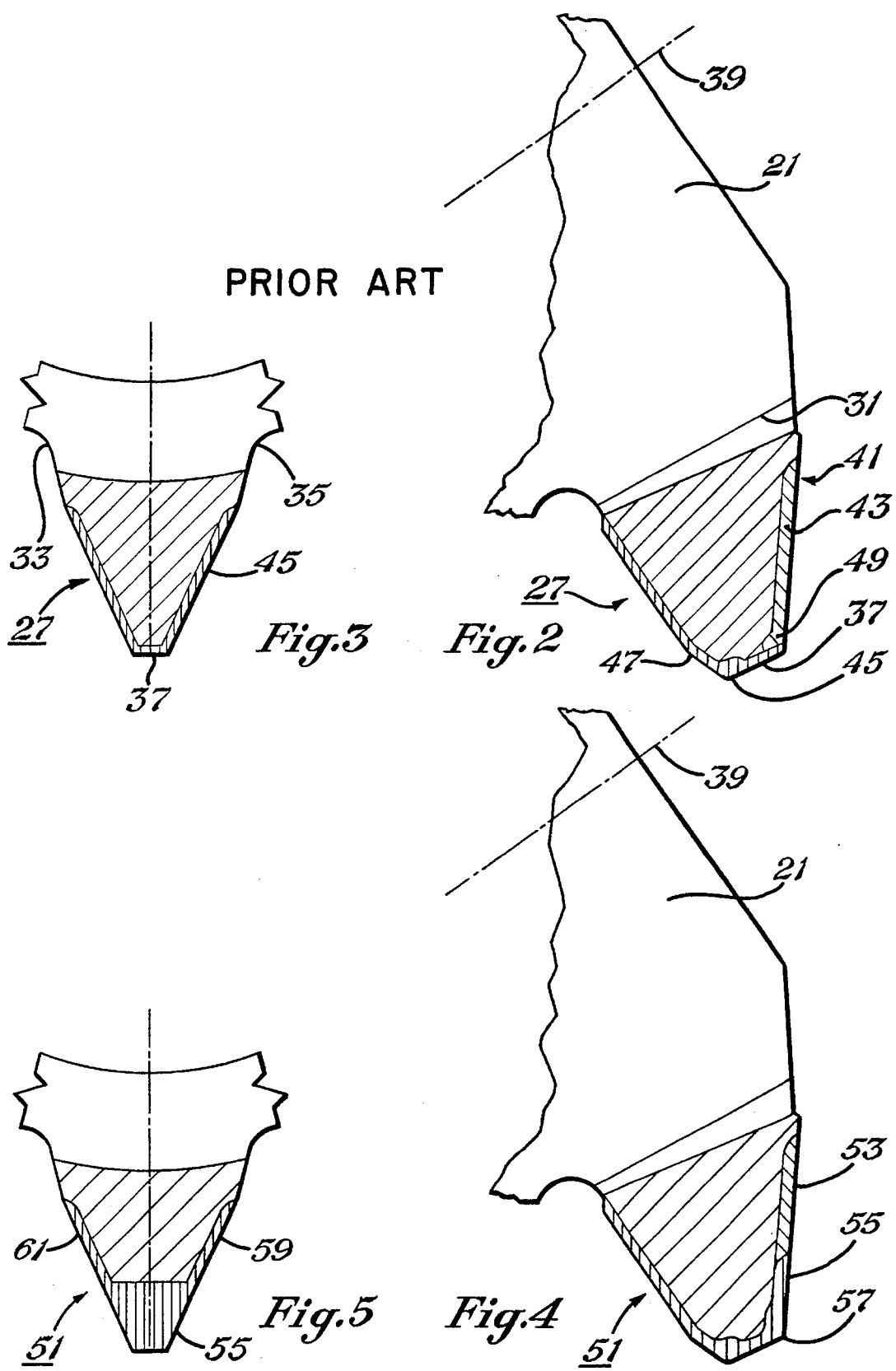

STEEL TOOTH BIT WITH A BI-METALLIC GAGE HARDFACING

BACKGROUND OF THE INVENTION

1. Field of the Invention

This invention relates to improvement in earth boring tools, especially steel tooth bits that use hardfacing containing carbide particles to enhance wear resistance.

2. Background Information

The earliest rolling cutter, earth boring bits had teeth machined integrally from steel, conically shaped, earth disintegrating cutters. These bits, commonly known as "steel-tooth" or "mill-tooth" bits, are typically used for penetrating the relatively soft geological formations of the earth. The strength and fracture-toughness of the steel teeth permits the effective use of relatively long teeth, which enables the aggressive gouging and scraping action that is advantageous for rapid penetration of soft formations with low compressive strengths.

However, it is rare that geological formations consist entirely of soft material with low compressive strength. Often, there are streaks of hard, abrasive materials that a steel tooth bit should penetrate economically without damage to the bit.

Although steel teeth possess good strength, abrasion resistance is inadequate to permit continued rapid penetration of hard or abrasive streaks. Consequently, it has been common in the art since at least the early 1930's to provide a layer of wear resistant metallurgical material called "hardfacing" over those portions of the teeth exposed to the severest wear. The hardfacing typically consists of extremely hard particles, such as sintered, cast or macrocrystalline tungsten carbide dispersed in a steel matrix. Such hardfacing materials are applied by welding a metallic matrix to the surface to be hardfaced and applying hard particles, usually tungsten carbide, to the molten matrix to form a homogeneous dispersion of hard particles in the matrix. The particles are much harder than the matrix but more brittle. The mixture of hard particles with a softer but tougher steel matrix is a synergistic combination that produces a good hardfacing.

There have been a variety of differing hardfacing materials and patterns, including special tooth configurations, to improve wear resistance or provide self sharpening. An example of a special groove to achieve a deeper deposit and a dual application of hardfacing, one on the crest and another in the groove, is shown in U.S. Pat. No. 2,660,405. A recent invention to increase the durability of teeth with a geometric alteration to the corners of the crests is disclosed in patent application Ser. No. 08/076,716, "Earth Boring Bit Having an Improved Hard-Faced Tooth Structure", filed Jun. 14, 1993, now U.S. Pat. No. 5,351,771. Dual layers of hardfacings, including an underlying layer of cast tungsten carbide applied with the "sweat-on" method and an upper layer applied with the oxyacetylene or atomic hydrogen torch method is shown in U.S. Pat. No. 3,260,579. An example of the use of dual particle sizes of tungsten carbide in a hardfacing to achieve self sharpening is disclosed in U.S. Pat. No. 4,726,432.

There are in general three basic types of tungsten carbide: (1) cast, (2) macrocrystalline and (3) cemented or sintered. All three have been used on earth boring tools, including the gage surfaces of rolling cutter drill bits.

Tungsten is capable of forming two carbides, WC and $W_2C$, and cast carbide is typically a mixture of these compounds. The cast carbides are frozen from the molten state and comminuted to selected particle sizes.

Macrocrystalline tungsten carbide is essentially stoichiometric WC usually in the form of single crystals. It is generally tougher and more stable than the cast tungsten carbides, which tend to be brittle and fracture more easily, especially as the supporting steel matrix abrades or erodes.

Sintered or cemented tungsten carbide consists of small particles of tungsten carbide, usually in the range of 1 to 15 microns bonded in a "binder" selected from the iron group metal of cobalt, nickel and iron, commonly cobalt. Tungsten carbide particles and a powder of cobalt are mixed, pressed and sintered near the melting temperature of the cobalt. The resulting mass is comminuted to form particles used for hardfacing.

Since the quest for improved wear resistance of drill bits has been essentially uninterrupted since the 1930's, there are numerous metallurgical mixtures or compositions that coordinate the type of carbide, particle size and matrix composition. The gage surface of a rolling cutter bit constantly rubs against the wall of the borehole and is often exposed to extremely abrasive wear. Consequently, the search for improvements in hardfacing often focuses on the gage surface. A mixture of sintered and single crystal monotungsten carbide particles in an alloy steel matrix is disclosed in U.S. Pat. No. 4,836,307 as one improved hardfacing for gage surfaces. A dispersion of more or less homogeneous sintered tungsten carbide particles in an alloy steel matrix is disclosed in U.S. Pat. No. 3,800,891. Nor has the search been limited to compositions and mixtures of tungsten, because it is known that other carbides such as titanium, are suitable in hardfacing compositions.

One of the most detrimental wear characteristics of steel tooth earth boring bits is the "breakdown" of the heel row teeth at the end of the crest near gage. This "breakdown" causes the teeth to round from the originally manufactured sharp condition, which lowers the rate of penetration (ROP) of a drill bit, requiring more work by the other teeth and shortening the life of the bearings that support the rotatable cutters. There has long been a need for significant improvements in maintaining the tooth geometry of the heel row teeth at the corners of the teeth near gage. This is the primary problem that is the focus of the following invention even though it has greater utility.

SUMMARY OF THE INVENTION

It is a general object of this invention to provide an earth-boring tool with more durable gage hardfacing.

This and other objects of this invention are achieved by providing in an otherwise conventional earth boring bit at least one cutter having a first hardfacing composition of carbide particles selected from the group consisting of cast and macrocrystalline tungsten carbide dispersed in a steel matrix deposited on the gage surface of at least some of the heel row teeth. Thus, a substantial portion of the particles of this composition are characterized by a high level of abrasion resistance and a lower level of fracture resistance. A second hardfacing composition of softer but less brittle carbide particles is selected preferably from the group consisting of spherical, sintered and cast tungsten carbide is dispersed in a steel matrix deposited over the crest of the teeth and an upper portion of the end or gage surface adjacent the crest that tends to round during drilling. A substantial portion of the particles of this composition are characterized by a high level of fracture resistance and a lower level of abrasion resistance.

Other objects, features, and advantages of this invention will become apparent to those of ordinary skill in the art in view of the following description.

DESCRIPTION OF THE DRAWINGS

FIGS. 2 and 3 are respectively a fragmentary side elevation view and a fragmentary inner end view of one tooth in a heel row of teeth, showing the deposits of hardfacing material in a prior art pattern.

FIGS. 4 and 5 are respectively a fragmentary side elevation view and a fragmentary inner end view of one tooth in a heel row of teeth, showing the deposits of hardfacing material according to the present invention.

DESCRIPTION OF THE PREFERRED EMBODIMENT

Figure 1:
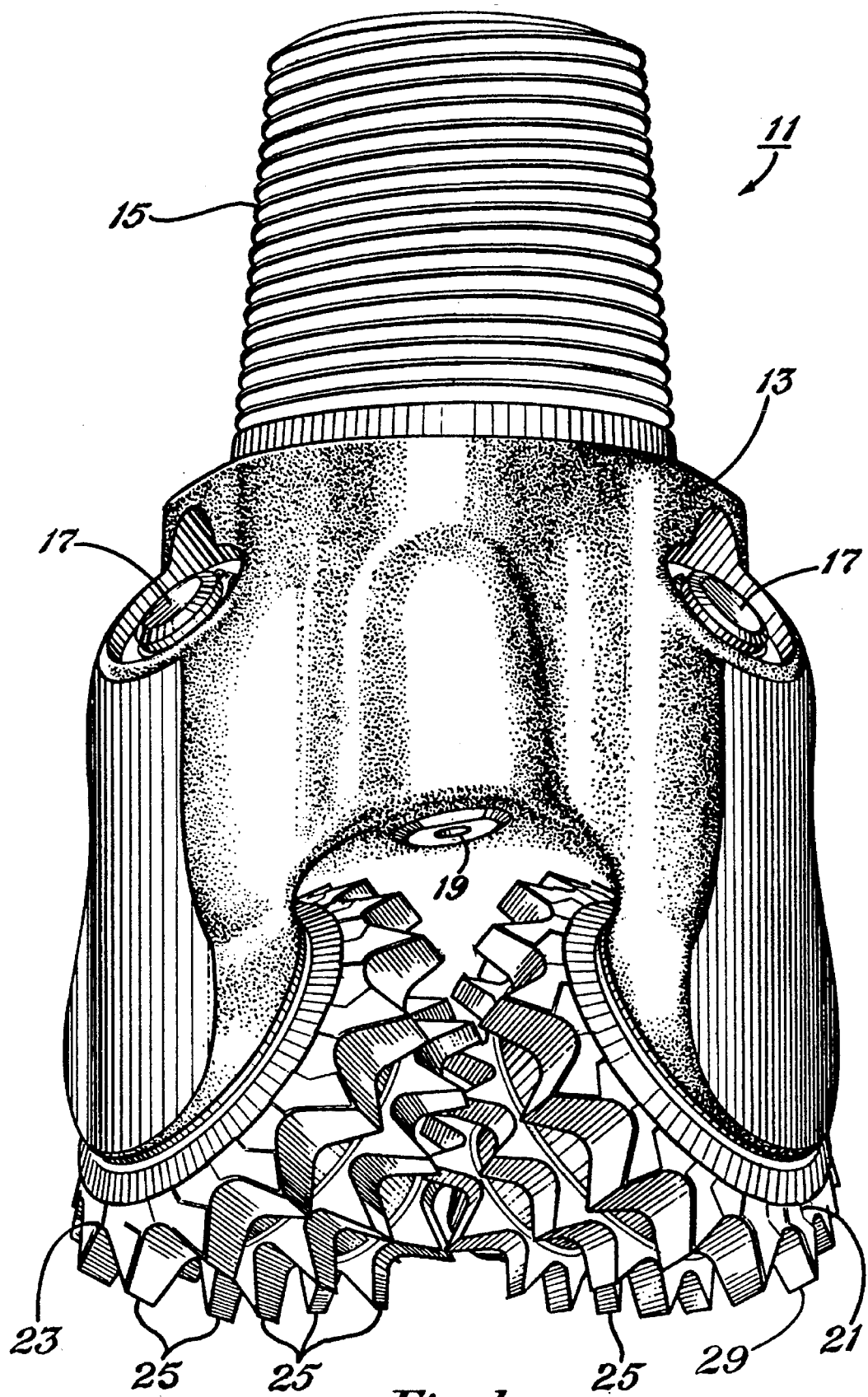
FIG. 1 is a perspective view of a prior art earth boring bit of the steel tooth type with which the invention is utilized.

Referring now to FIG. 1, a prior art earth boring bit 11, modified according to the present invention, is depicted. Earth-boring bit 11 includes a bit body 13 having threads 15 at its upper extent for connecting bit 11 into a drillstring (not shown). Each leg of bit 11 is provided with a lubricant compensator 17. At least one nozzle 19 is provided in bit body 13 for directing pressurized drilling fluid from within the drill string and bit against the bottom of the borehole.

The cutters, generally three (one of which is obscured from view in FIG. 1), 21, 23 are rotatably secured to a respective leg of bit body 13. A plurality of teeth 25 are arranged in generally circumferential rows on cutters 21, 23, being integrally formed on the cutters, usually by machining.

In FIGS. 2 and 3 is illustrated a heel tooth 27 in a heel row 29 (see FIG. 1) in the cutter 21 of FIG. 1 and a prior art hardfacing pattern. Tooth 27 is formed with a milling cutter forming a root 31 and a configuration to form flanks 33, 35 and a crest 37 that extends longitudinally of the rotational axis 39 of the cutter. A gage surface 41 is defined by a ground deposit of a first hardfacing composition 43. The flanks of the tooth 27 includes a deposit of a second hardfacing composition 45 that extends over the crest 37. The inner and outer ends of the tooth 27 are notched at 47, 49 as explained in application Ser. No. 08/076,716, filed Jun. 14, 1993, now U.S. Pat. No. 5,351,771.

In FIGS. 4 and 5 is illustrated a heel tooth 51 having the same geometrical configuration as tooth 27 of FIGS. 2 and 3, except for the pattern of the hardfacing. Here, the gage or first hardfacing composition 53 adjoins by the second or flank and crest hardfacing 55 that extends over the crest and downwardly past the corner 57 that engages the corner (not shown) of the borehole between the wall and bottom. Preferably, the second hardfacing composition extends about one third the tooth height and in this instance also covers the flank 59, 61.

The first hardfacing composition 53 contains particles selected from the group consisting of cast and macrocrystalline tungsten carbide dispersed in a steel matrix deposited on the gage surface of the heel row teeth. Thus, a substantial portion of the particles of this composition are characterized by a high level of abrasion resistance and a lower level of fracture resistance. The second hardfacing composition 55 contains carbide particles selected from the group consisting of spherical, sintered and cast tungsten carbide dispersed in a steel matrix deposited over at least the crest and an upper portion of the gage surface adjacent the corner of crest that tends to round during drilling. A substantial portion of the particles of this composition are characterized by a high level of fracture resistance and a lower level of abrasion resistance.

Example of the first and second hardfacings successfully used in earth drilling bits is as follows:

EXAMPLE

The second hardfacing composition 53, characterized by a high level of abrasion resistance and a lower level of fracture resistance contained macrocrystalline tungsten carbide particles of 60–80 mesh applied in a mild steel 3/16 inch tube by oxyacetylene welding. The percent by weight of the tungsten carbide particles is typically 70% of the deposit.

The first hardfacing composition 55, contained a mixture of cemented tungsten carbide spheres of 16–30 mesh and particles of crushed cemented tungsten carbide of 20–30 mesh and crushed cast tungsten carbide of 60–80 mesh. The percent by weight of the above three tungsten carbide particles in the rod is respectively 66, 15 and 15%. The rod contained deoxidizer of silicomanganese of about four percent and niobium of less than one percent.

The initial deposit was of hardfacing 55, was applied to the gage teeth of a Hughes Christensen 9 7/8 inch ATJ-1S™ followed by deposit of hardfacing 53. A final deposit of the 53 hardfacing is generally made over the entire gage to assure sufficient thickness for the gage grinding operation. The gage surface was ground to the first gage dimension and the final deposit of 53 removed except for low areas to produce depth of hardfacing 53, 55 from 0.090 to 0.120 inch.

A 9 7/8 inch ATJ-1S™ test bit having hardfacing on selected heel teeth as disclosed above showed superior resistance to gage rounding and maintenance of tooth sharpness.

While the invention has been shown in only one of its preferred embodiments, it is thus not limited but is susceptible to variation and modification without departure from the spirit thereof.

We claim:

1. An improved earth-boring bit comprising:

a bit body;

at least one earth disintegrating cutter, generally conically shaped, rotatably secured to the bit body, the cutter having a plurality of teeth integrally formed thereon, each of the teeth including ends, flanks, and a crest connecting the ends and flanks;

an outermost row of teeth defining a heel row to disintegrate earth at the corner of the borehole, the outer ends of the teeth forming a conical, gage surface that engages the wall of the borehole;

the crest of at least one of the heel row teeth defining a corner with an associated gage surface to engage the corner of the borehole;

a first hardfacing composition of carbide particles dispersed in a metallic matrix deposited on the gage surface of said at least one of the heel row teeth, a substantial portion of the particles of this composition characterized by a high level of abrasion resistance and a lower level of fracture resistance;

a second hardfacing composition of carbide particles dispersed in a metallic matrix deposited over at least the crest and an upper portion of a selected distance down the gage surface adjacent the crest that tends to round during drilling, a substantial portion of the particles of this composition characterized by a high level of fracture resistance and a lower level of abrasion resistance.

2. The invention of claim 1 wherein the carbide particles of the first hardfacing composition are selected from the group consisting of cast tungsten carbide, macrocrystalline tungsten carbide and mixtures thereof.

3. The invention of claim 2 wherein the second hardfacing composition is selected from the group consisting of sintered tungsten carbide, cast tungsten carbide and mixtures thereof.

4. The invention of claim 3 wherein the carbide particles of the second hardfacing composition comprise essentially sintered tungsten carbide.

5. The invention of claim 1 wherein the carbide particles of the first hardfacing composition are macrocrystalline tungsten carbide having a preapplication mesh size in a range of about 40 to 80.

6. The invention of claim 3 wherein the carbide particles of the second hardfacing composition comprise sintered tungsten carbide having a pre-application mesh size of 16 to 30.

7. The invention of claim 3 wherein the carbide particles comprise spherical sintered tungsten carbide having a mesh size in the range of 16 to 30 and cast particles having a mesh size in the range of 40 to 80.

\* \* \* \* \*